(12) United States Patent
Lin et al.

(10) Patent No.: US 12,481,361 B2
(45) Date of Patent: Nov. 25, 2025

(54) SYSTEM AND METHOD FOR ADJUSTING IMAGE BASED ON PHYSIOLOGICAL INFORMATION AND POSTURE

(71) Applicant: Industrial Technology Research Institute, Hsinchu (TW)

(72) Inventors: Shu-Yu Lin, Taoyuan (TW); Yen-Nien Lu, Tainan (TW); Kang Heng Mah, Hsinchu County (TW); Chun-Hsien Tien, Nantou County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/645,396

(22) Filed: Apr. 25, 2024

(65) Prior Publication Data

US 2025/0284336 A1    Sep. 11, 2025

(30) Foreign Application Priority Data

Mar. 5, 2024    (TW) .................................. 113107850

(51) Int. Cl.
  *G06F 3/01*    (2006.01)
  *A63B 24/00*    (2006.01)
  *A63B 71/06*    (2006.01)

(52) U.S. Cl.
  CPC .......... *G06F 3/015* (2013.01); *A63B 24/0062* (2013.01); *A63B 71/0622* (2013.01); *G06F 3/013* (2013.01); *A63B 2071/0644* (2013.01); *A63B 2220/05* (2013.01); *A63B 2220/806* (2013.01); *A63B 2220/836* (2013.01); *A63B 2230/625* (2013.01)

(58) Field of Classification Search
  None
  See application file for complete search history.

(56) References Cited

U.S. PATENT DOCUMENTS

| 6,711,544 B2 | 3/2004 | Spiser-Albert et al. |
| 10,679,396 B2 | 6/2020 | Thielen et al. |
| 10,696,305 B2 | 6/2020 | Zhang et al. |

(Continued)

FOREIGN PATENT DOCUMENTS

| CN | 103705218 | 4/2014 |
| CN | 103505313 | 1/2016 |

(Continued)

OTHER PUBLICATIONS

Tiwana Varrecchia et al., "Trunk Muscle Coactivation in People with and without Low Back Pain during Fatiguing Frequency-Dependent Lifting Activities", Sensors, Feb. 12, 2022, pp. 1-16.

(Continued)

*Primary Examiner* — Kirk W Hermann
(74) *Attorney, Agent, or Firm* — JCIPRNET

(57) ABSTRACT

A method for adjusting an image based on physiological information and a posture includes following steps: obtaining a physiological information value corresponding to a user by a processor through a wearable device; obtaining a posture value corresponding to the user by the processor through an image capturing device; and adjusting the image by the processor based on at least one of the physiological information value and the posture value correspondingly.

25 Claims, 6 Drawing Sheets

(56) References Cited

U.S. PATENT DOCUMENTS

| | | | |
|---|---|---|---|
| 10,999,710 B2 | 5/2021 | Kumar et al. | |
| 11,270,699 B2 | 3/2022 | Penilla et al. | |
| 11,277,728 B2 | 3/2022 | Gold et al. | |
| 2005/0250996 A1* | 11/2005 | Shirai | A61B 3/113 600/549 |
| 2012/0309551 A1* | 12/2012 | Holzhacker | A63B 24/0087 472/136 |
| 2013/0178337 A1* | 7/2013 | Brammer | A63B 22/02 482/9 |
| 2015/0178912 A1* | 6/2015 | Im | G09B 19/00 348/77 |
| 2017/0095732 A1* | 4/2017 | Ghaffari | A63F 13/212 |
| 2017/0323485 A1* | 11/2017 | Samec | G06F 3/013 |
| 2018/0299955 A1* | 10/2018 | Chen | A63F 13/67 |
| 2020/0254311 A1* | 8/2020 | Watterson | A63B 22/025 |
| 2021/0118329 A1 | 4/2021 | Medan et al. | |
| 2021/0221404 A1 | 7/2021 | Reiner et al. | |
| 2022/0203168 A1 | 6/2022 | Calderon | |
| 2023/0148905 A1 | 5/2023 | Guerrero et al. | |
| 2024/0028114 A1* | 1/2024 | Cockram | G06F 3/013 |

FOREIGN PATENT DOCUMENTS

| | | | | |
|---|---|---|---|---|
| CN | 109116991 A | * | 1/2019 | A61B 5/02438 |
| CN | 113691867 | | 11/2021 | |
| CN | 113893516 | | 1/2022 | |
| CN | 115569368 | | 1/2023 | |
| CN | 115569368 A | * | 1/2023 | |
| CN | 115984829 | | 4/2023 | |
| CN | 115989067 | | 4/2023 | |
| CN | 116074592 | | 5/2023 | |
| CN | 117115901 | | 11/2023 | |
| JP | 2011229596 A | * | 11/2011 | |
| KR | 101734845 B1 | * | 5/2017 | |
| TW | 201039276 | | 11/2010 | |
| TW | I376652 | | 11/2012 | |
| TW | 202133046 | | 9/2021 | |
| TW | I773604 | | 8/2022 | |
| TW | I798499 | | 4/2023 | |
| WO | WO-2019010650 A1 | * | 1/2019 | |

OTHER PUBLICATIONS

Sander Koelstra et al., "DEAP: A Database for Emotion Analysis Using Physiological Signals", IEEE Transactions on Affective Computing, vol. 3, No. 1, Jan. 3, 2012, pp. 18-31.

Haisong Gu et al., "An Automated Face Reader for Fatigue Detection", Proceedings of the Sixth IEEE International Conference on Automatic Face and Gesture Recognition, May 19, 2004, pp. 1-6.

Salik Ram Khanal et al., "Physical exercise intensity monitoring through eye-blink and mouth's shape analysis", 2018 2nd International Conference on Technology and Innovation in Sports, Health and Wellbeing (TISHW), Jun. 22, 2018, pp. 1-5.

Sina Ameli et al., "Assessment of Exercise Induced Fatigue through Motion Analysis", TENCON 2015—2015 IEEE Region 10 Conference, Nov. 2, 2015, pp. 1-4.

Don Kimber et al., "Trailblazing: Video Playback Control by Direct Object Manipulation", 2007 IEEE International Conference on Multimedia and Expo, Jul. 2, 2007, pp. 1-4.

"Office Action of Taiwan Counterpart Application", issued on Jan. 6, 2025, p. 1-p. 5.

"Office Action of Taiwan Counterpart Application", issued on Aug. 20, 2025, p. 1-p. 8.

\* cited by examiner

SYSTEM AND METHOD FOR ADJUSTING IMAGE BASED ON PHYSIOLOGICAL INFORMATION AND POSTURE

CROSS-REFERENCE TO RELATED APPLICATION

This application claims the priority benefit of Taiwan application serial no. 113107850, filed on Mar. 5, 2024. The entirety of the above-mentioned patent application is hereby incorporated by reference herein and made a part of this specification.

TECHNICAL FIELD

The disclosure relates to a system and method for adjusting image based on physiological information and posture.

BACKGROUND

At present, a trend of exercising at home is very popular. A user may follow a sports video image or a game image displayed on a display device (such as a screen) to achieve a purpose of exercise. However, a stationary image may easily cause the user to feel a sense of incompatibility between the exercise and a visual image during the exercise. In addition, since the user who exercises at home usually exercises alone, when the time is too long or the exercise intensity does not match user's physical ability, it may cause danger.

SUMMARY

The disclosure provides a system for adjusting an image based on physiological information and a posture including a wearable device, an image capturing device, a display device and a processor. The display device is configured to display the image. The processor is communicatively connected to the wearable device, the image capturing device and the display device, wherein the processor obtains a physiological information value corresponding to a user through the wearable device, the processor obtains a posture value corresponding to the user through the image capturing device, and the processor correspondingly adjusts the image according to at least one of the physiological information value and the posture value.

The disclosure provides a method for adjusting an image based on physiological information and a posture including: obtaining a physiological information value corresponding to a user by a processor through a wearable device; obtaining a posture value corresponding to the user by the processor through an image capturing device; and correspondingly adjusting the image by the processor based on at least one of the physiological information value and the posture value.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
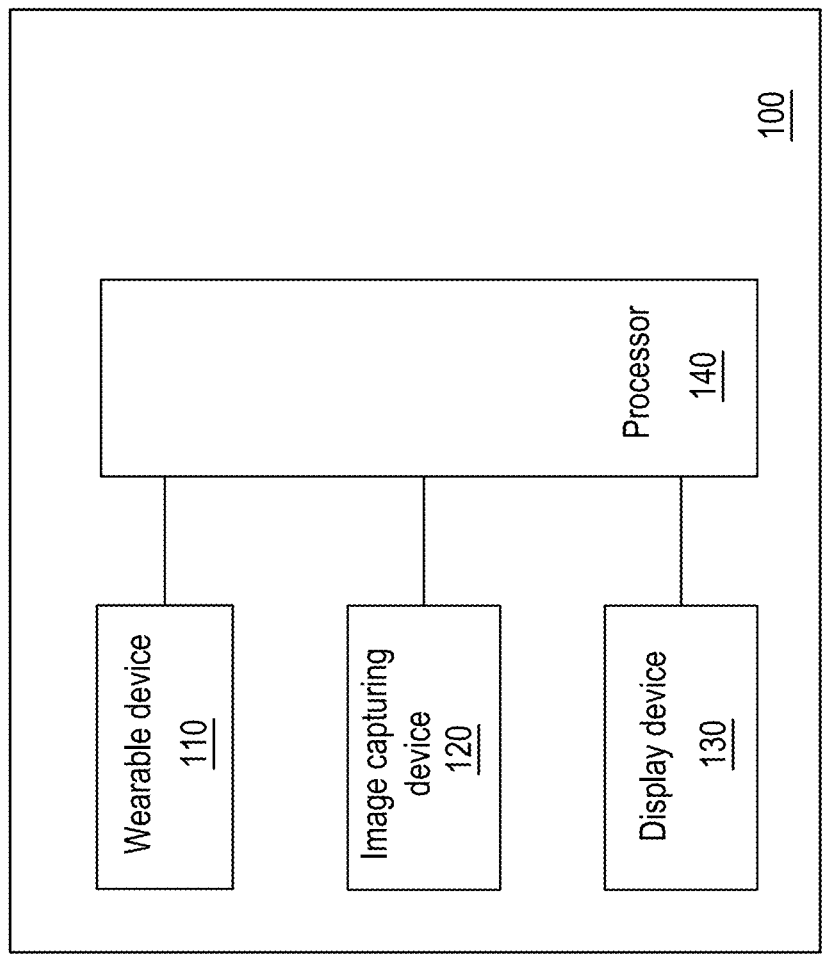
FIG. 1 is a schematic diagram of a system for adjusting an image based on physiological information and a posture according to an embodiment of the disclosure.

FIG. 1 is a schematic diagram of a system 100 for adjusting an image based on physiological information and a posture according to an embodiment of the disclosure. Referring to FIG. 1, the system 100 is used for a user and may include a wearable device 110, an image capturing device 120, a display device 130 and a processor 140. The display device 130 may be used to display an image. In the embodiment, the processor 140 may be communicatively connected to the wearable device 110, the image capturing device 120 and the display device 130. The communication connections may be implemented through, for example, a connection cable in a wired manner, or a wireless network, Bluetooth, etc., in a wireless manner, which is not limited by the disclosure.

The wearable device 110 is, for example, a head-mounted device or a watch, which is worn by the user and may obtain a physiological information value corresponding to the user from the user.

The image capturing device 120 is, for example, a video camera, which is used to capture images of the user, and may obtain a posture value corresponding to the user from the user.

The display device 130, such as a screen or a touch panel, may be only used to display images. In other embodiments, the user may touch the display device 130 to adjust related settings, which is not limited by the disclosure.

The processor 140 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components.

Figure 2:
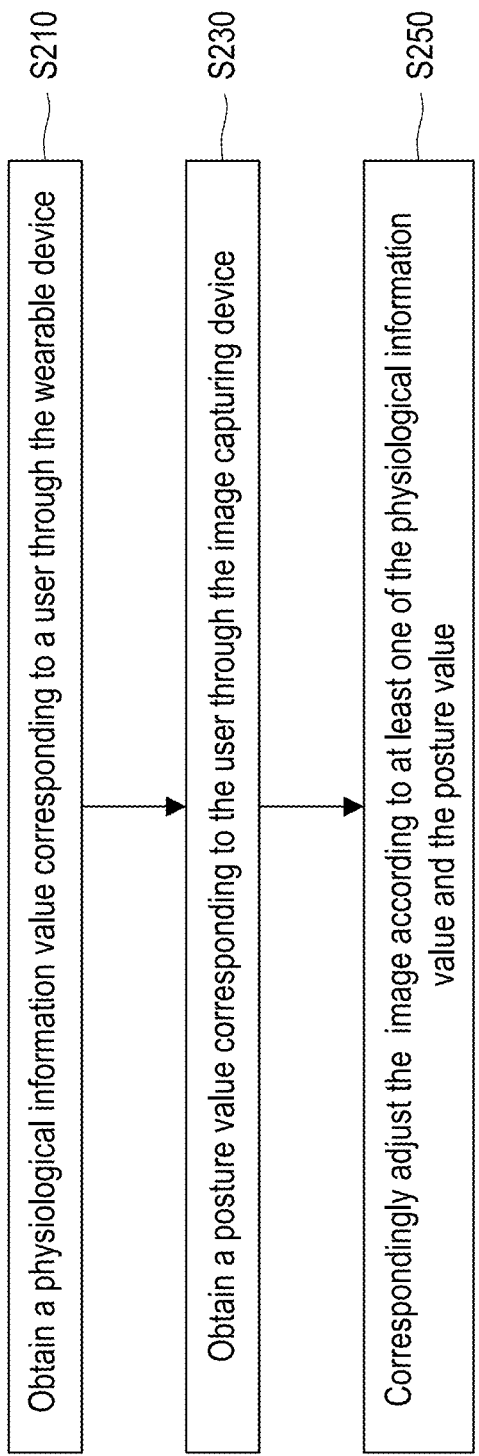
FIG. 2 is a flowchart illustrating a method for adjusting an image based on physiological information and a posture according to an embodiment of the disclosure.

FIG. 2 is a flowchart illustrating a method for adjusting an image based on physiological information and a posture according to an embodiment of the disclosure, where the method may be implemented by the system 100 shown in FIG. 1. Please refer to both FIG. 1 and FIG. 2.

In step S210, the processor 140 may obtain the physiological information value corresponding to the user through the wearable device 110. In detail, the physiological information value may include but is not limited to a blood sugar value, a blood pressure value, a heartbeat count, a respiratory count, a blood lipid value, and an electrocardiogram step S230, the processor 140 may obtain a posture value corresponding to the user through the image capturing device 120. In detail, the posture value may include, but is not limited to, a painful expression count, a teeth clenching count, an eye closing count, a heavy gasping count, an action mismatch count, and a muscle part state value.

Figure 3:
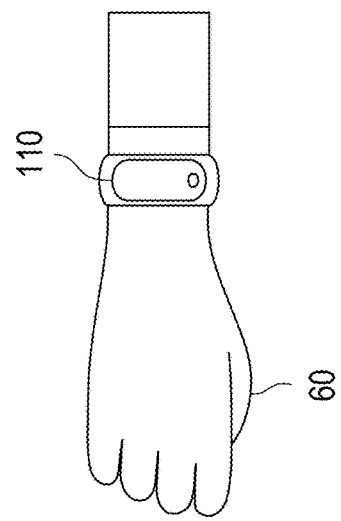
FIG. 3 is a schematic diagram of an application scenario of the system shown in FIG. 1.
Figure 3:
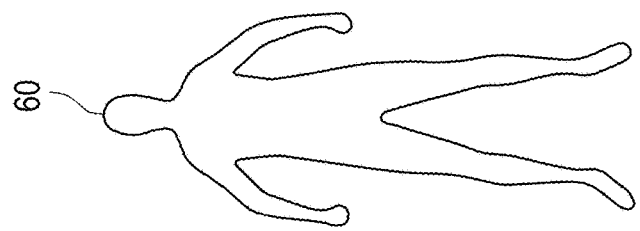
Figure 3:
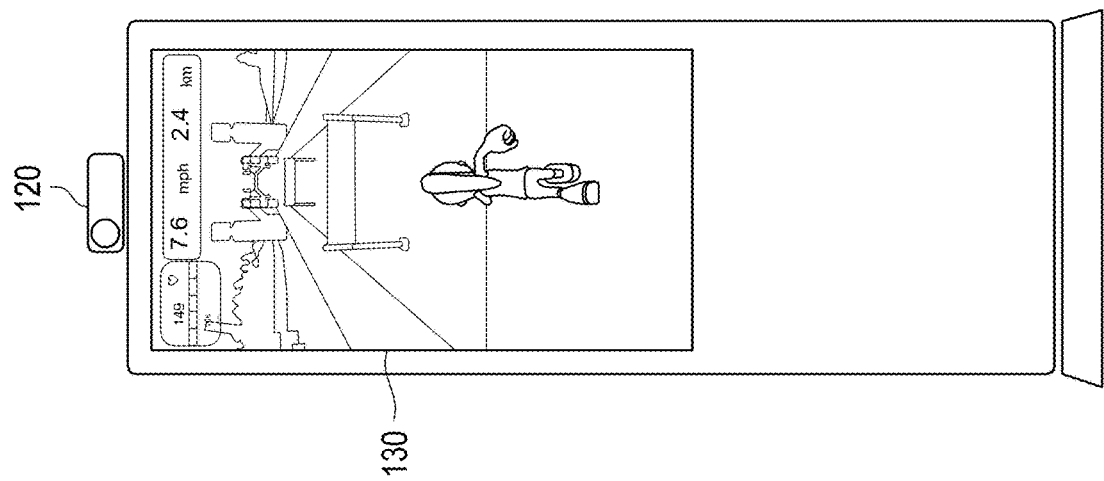

FIG. 3 is a schematic diagram of an application scenario of the system 100 shown in FIG. 1. Please also refer to FIG. 1 to FIG. 3, the image displayed by the processor 140 through the display device 130 may be used to prompt the user 60 to put on/wear the wearable device 110 and prompt the user 60 to perform specific exercises. The wearable device 110 obtains the physiological information value corresponding to the user from the user, and the image capturing device 120 obtains the posture value corresponding to the user from the user. Then, the processor 140 may perform the steps of FIG. 2.

Figure 4:
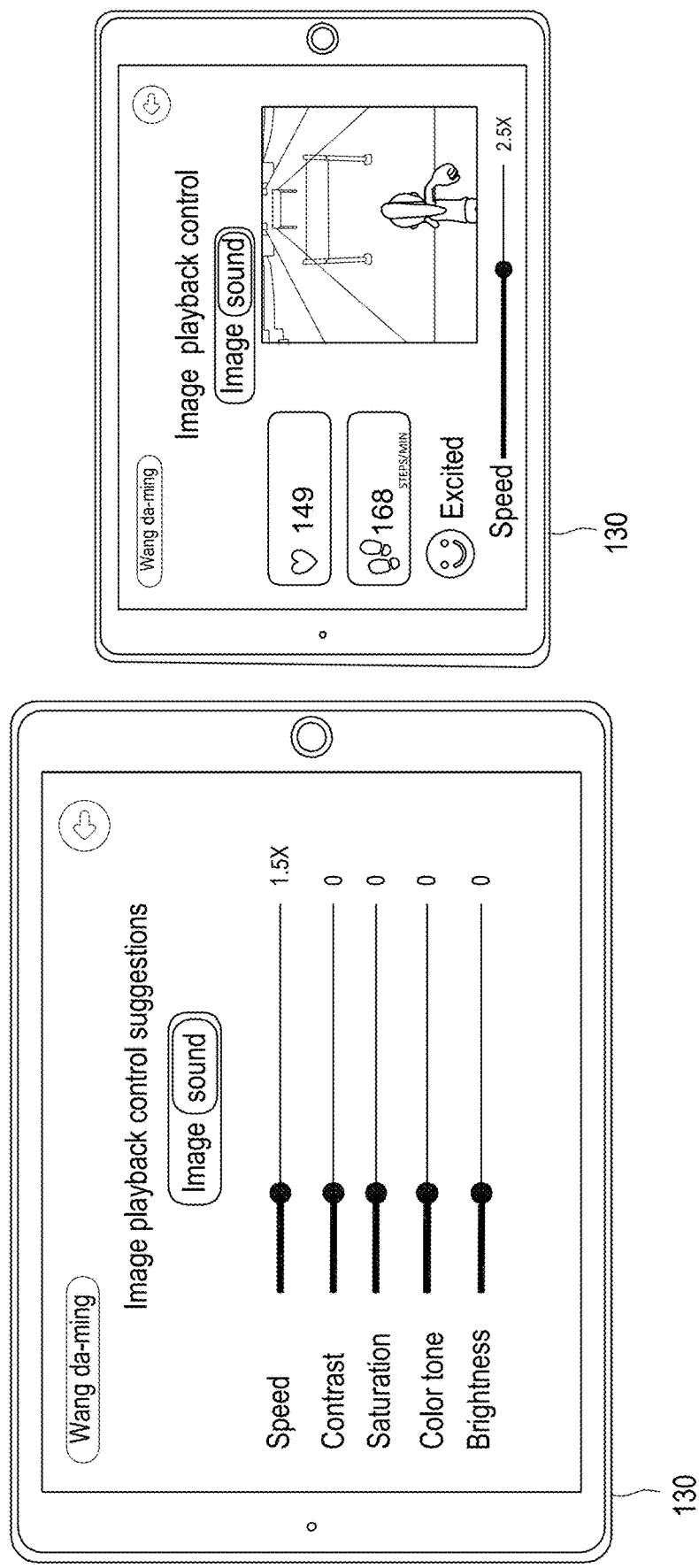
FIG. 4 is a schematic diagram of adjusting an image according to an embodiment of the disclosure.

FIG. 4 is a schematic diagram of adjusting an image according to an embodiment of the disclosure. Please refer to FIG. 1 to FIG. 4 simultaneously, in step S250, the processor 140 may correspondingly adjust the image according to at least one of the physiological information value and the posture value.

In an embodiment, when the processor 140 determines that the physiological information value is greater than a physiological information threshold, the processor 140 may adjust the image to a relaxed state. Specifically, the relaxed state may indicate reducing a display speed of the image, i.e., reducing a speed of image changes. In other embodiments, the relaxed state may correspond to relaxed image content. In other words, when the processor 140 determines that the physiological information value of the user is greater than the physiological information threshold, the processor 140 may reduce the display speed of the image displayed by the display device 130 and/or display relaxed image content in the image. For example, the processor 140 may display an image of a character stopping or standing still through the display device 130, or display messages such as "it is recommended that you slow down", "it is recommended that you relax" to remind the user, thereby preventing the user from being in danger due to intense exercise. Or in an embodiment, the relaxed image content may indicate reducing a contrast of the image, reducing a saturation of the image, presenting the image in a cool tone, or reducing a brightness of the image. In detail: (a) "reducing the contrast of the image": the processor 140 may reduce the difference in shades of colors in the image to make the image softer, and the processor 140 may soften contour of objects in the image to reduce sharpness of edges of the objects, so that the overall image looks smoother. (b) "reducing the saturation of the image": the processor 140 may reduce vividness of the colors in the image, making the image to present darker and softer tones. Furthermore, the processor 140 may use lighter colors in the image to create a relaxing atmosphere. (c) "presenting the image in the cool tone": since the cool tone (such as blue or green) is usually a calmer and relaxing color, the processor 140 may use the cool tone in the image. Similarly, the processor 140 may use softer tones in the image and avoid high contrast and bright colors. (d) "reducing the brightness of the image": the processor 140 may reduce a brightness of the image to make the image presenting a darker state, which helps relax the user's eyes. Furthermore, the processor 140 may adjust the brightness of the image according to ambient light conditions where the user is located to achieve the most suitable viewing experience. Implementation examples of the physiological information value and the physiological information threshold will be further described below.

The physiological information value may include the heartbeat count, and the physiological information threshold may include a heartbeat count threshold, where the user may correspond to a user age, and the heartbeat count threshold may be associated with the user age. When the processor 140 determines that the heartbeat count is greater than the heartbeat count threshold, the processor 140 may adjust the image to the relaxed state. For example, the heartbeat count threshold may be "220-user age". When the user is 30 years old and the current heartbeat count of the user is 195, since the heartbeat count is greater than the heartbeat count threshold (220−30=190), the processor 140 may adjust the image to the relaxed state.

The physiological information value may include the blood pressure value, and the physiological information threshold value may include a blood pressure value threshold. When the processor 140 determines that the blood pressure value is greater than the blood pressure value threshold, the processor 140 may adjust the image to the relaxed state. For example, the blood pressure threshold may be 220 mm of mercury, and when the processor 140 determines that blood pressure value of the user (for example, 230 mm of mercury) is greater than 220 mm of mercury, the processor 140 adjusts the image to the relaxed state.

The physiological information value may include a respiratory count, and the physiological information threshold may include a respiratory count threshold. When the processor 140 determines that the respiratory count is greater than the respiratory count threshold, for example, the respiratory count is 180 times and the respiratory count threshold is 175 times, the processor 140 may adjust the image to the relaxed state.

In an embodiment, when the processor 140 determines that the physiological information value is not greater than the physiological information threshold, the processor 140 may adjust the image to an intense state. Furthermore, the intense state may indicate increasing the display speed of the image. Here, the physiological information value of "heartbeat count" is used as an example for explanation. It is assumed that the user is 30 years old, and the heartbeat count threshold is "220-user age" (in other words, the heartbeat count threshold is 220−30=190). When the processor 140 determines that the heartbeat count of the user is within a range of 55% to 75% of the heartbeat count threshold, the processor 140 may increase the display speed of the image to a first speed. On the other hand, when the processor 140 determines that the heartbeat count of the user is within a range of 75% to 85% of the heartbeat count threshold, the processor 140 may increase the display speed of the image to a second speed. On the other hand, when the processor 140 determines that the heartbeat count of the user is within a range of 85% to 95% of the heartbeat count threshold, the processor 140 may increase the display speed of the image to a third speed. On the other hand, when the processor 140 determines that the heartbeat count of the user is within a range of 95% to 100% of the heartbeat count threshold, the processor 140 may increase the display speed of the image to a fourth speed.

In other embodiments, the intense state may correspond to intense image content, where the intense image content may indicate increasing a contrast of the image, increasing a saturation of the image, presenting the image in a warm tone, or maintaining a brightness of the image. Specifically: (a) "increasing the contrast of the image": the processor 140 may increase a difference in shades of colors in the image to allow users to identify objects more clearly, and the processor 140 may enhance contour of the objects in the image to highlight edges of the objects, so that it is easier for users to identify a surrounding environment. (b) "increasing the saturation of the image": the processor 140 may increase the vividness of the colors in the image to make the image more vivid. Furthermore, the processor 140 may correspondingly adjust a saturation of a specific color in the image according to the type of exercise that the user is performing to highlight key elements. (c) "presenting the image in the warm tone": the processor 140 may use a warm tone in the image to help improving user's comfort. (d) "maintaining the brightness of the image": the processor 140 may maintain sufficient brightness of the image to ensure that the user may clearly see the surrounding environment in the image and avoid visual fatigue of the user. Furthermore, the processor 140 may adjust the brightness of the image according to ambient light conditions where the user is located to achieve the most suitable viewing experience. On the other hand, when the processor 140 determines that the physiological information value is greater than the physiological information threshold (i.e., the user's body has begun to feel tired), the processor 140 may adjust the image to the relaxed state. Furthermore, in addition to the above adjustment operation of the physiological information threshold, the user may also operate the display device 130 to correspondingly modify/set the speed, contrast, saturation, color tone and brightness of the image in the above "relaxed state".

In an embodiment, when the processor 140 determines that the physiological information value is not greater than the physiological information threshold, the processor 140 may not adjust the image to the relaxed state or the intense state. For example, the display device 130 may display a prompt message to allow the user to continuously doing exercises and maintain the speed of image display.

It should be noted that the above-mentioned physiological information threshold is, for example, a default value pre-stored by the system 100, but the disclosure is not limited thereto. Specifically, the processor 140 may receive an adjustment operation of the physiological information threshold corresponding to the physiological information threshold through the display device 130. In other words, the user may also modify the physiological information threshold, for example, by manually touching the display device 130 and inputting the physiological information threshold, but the disclosure is not limited thereto.

Figure 5:
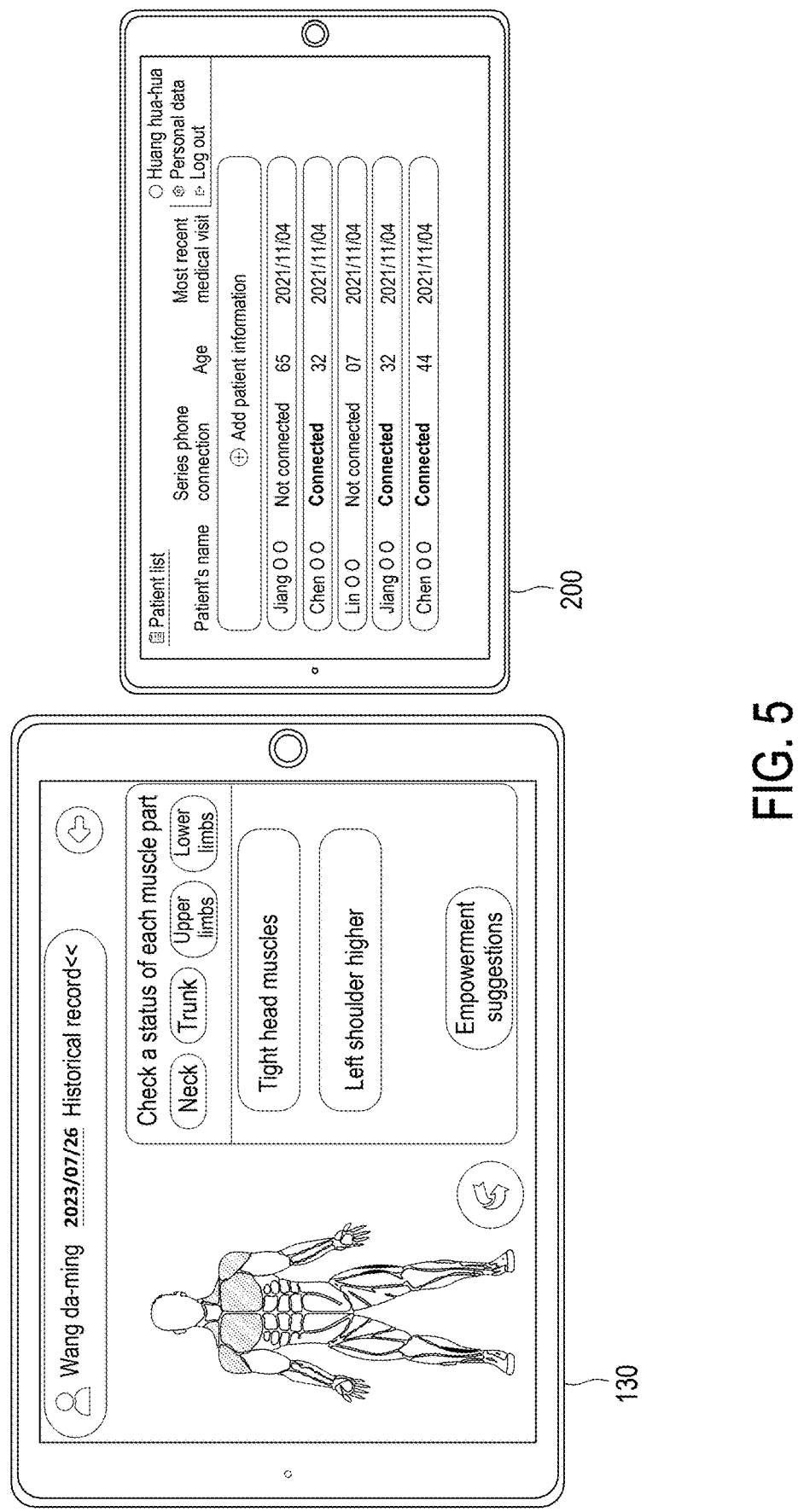
FIG. 5 is a schematic diagram of adjusting an image according to another embodiment of the disclosure.

FIG. 5 is a schematic diagram of adjusting an image according to another embodiment of the disclosure. Please refer to FIG. 1 to FIG. 5, as shown in FIG. 5, the processor 140 may display a current user test state (for example, whether the user's posture is normal, or a state of each muscle part of the user) corresponding to the user through the display device 130. Furthermore, the system 100 may be communicatively connected to a professional device 200. If the system 100 cannot determine the current user test state of the user in time, a professional using the professional device 200 may assist in determining the current user test state of the user. In addition, when the professional believes that the judgment of the system 100 on the current user test state is wrong, the professional may ask the user to repeat the test to re-judge.

In an embodiment, when the processor 140 determines that the posture value is greater than a posture value threshold, the processor 140 may adjust the image to the relaxed state, which means reducing a speed of the image change. In other words, when the processor 140 determines that the posture value of the user is greater than the posture value threshold, the processor 140 may reduce the display speed of the image of the image displayed by the display device 130 and/or display relaxed image content in the image (for example, the processor 140 may display an image of a character stopping or standing still through the display device 130, or display messages such as "it is recommended that you slow down", "it is recommended that you relax" to remind the user), thereby preventing the user from being in danger due to intense exercise. Implementation examples of posture values and posture value thresholds will be further described below.

The posture value may include the teeth clenching count, and the posture value threshold may include a teeth clenching count threshold. When the processor 140 determines that the teeth clenching count is greater than the teeth clenching count threshold, the processor 140 may adjust the image to the relaxed state.

The posture value may include the eye closing count, and the posture value threshold may include an eye closing count threshold. When the processor 140 determines that the eye closing count is greater than the eye closing count threshold, the processor 140 may adjust the image to the relaxed state. For example, the eye closing count threshold may be 14 times per minute, and when the eye closing count is, for example, 16 times per minute, the processor 140 may reduce the display speed of the image.

The posture value may include the painful expression count, and the posture value threshold may include a painful expression count threshold. When the processor 140 determines that the painful expression count is greater than the painful expression count threshold, the processor 140 may adjust the image to the relaxed state.

The posture value may include the heavy gasping count, and the posture value threshold may include a heavy gasping count threshold. When the processor 140 determines that the heavy gasping count is greater than the heavy gasping count threshold, the processor 140 may adjust the image to the relaxed state. For example, the heavy gasping count threshold may be 30 times per minute, and when the heavy gasping count is, for example, 31 times per minute, the processor 140 may reduce the display speed of the image.

The posture value may include the action mismatch count, and the posture value threshold may include an action mismatch count threshold. When the processor 140 determines that the action mismatch count is greater than the action mismatch count threshold, the processor 140 may adjust the image to the relaxed state. For example, the action mismatch count may be a number of times that the user's actions do not match actions of a character in the image. The action mismatch count threshold may be 3 times per minute, and when the action mismatch count is, for example, 4 times per minute, the process 140 may adjust the display speed of the image to the relaxed state.

The posture value may include the muscle part state value, and the posture value threshold may include a muscle part state value threshold. When the processor 140 determines that the muscle part state value is greater than the muscle part state value threshold, the processor 140 may adjust the image to the relaxed state. For example, the muscle part state value threshold may be muscle relaxation, and when the muscle part state value is, for example, muscle tension, the processor 140 reduces the display speed of the image.

In another embodiment, when the processor 140 determines that the posture value is not greater than the posture value threshold, the processor 140 does not adjust the image (for example, maintain the display speed of the image) or adjust the image to the intense state, where the intense state may be the same as the intense state of adjusting the image when the processor 140 determines that the physiological information value is not greater than the physiological information threshold, which will not be repeated.

It should be noted here that the above-mentioned posture value threshold is, for example, a default value stored in advance by the system 100, but the disclosure is not limited thereto. Specifically, the processor 140 may receive the posture value threshold adjustment operation corresponding to the posture value threshold through the display device 130. In other words, the user may also modify the posture value threshold, for example, by manually touching the display device 130 and inputting the posture value threshold, but the disclosure is not limited thereto.

Figure 6:
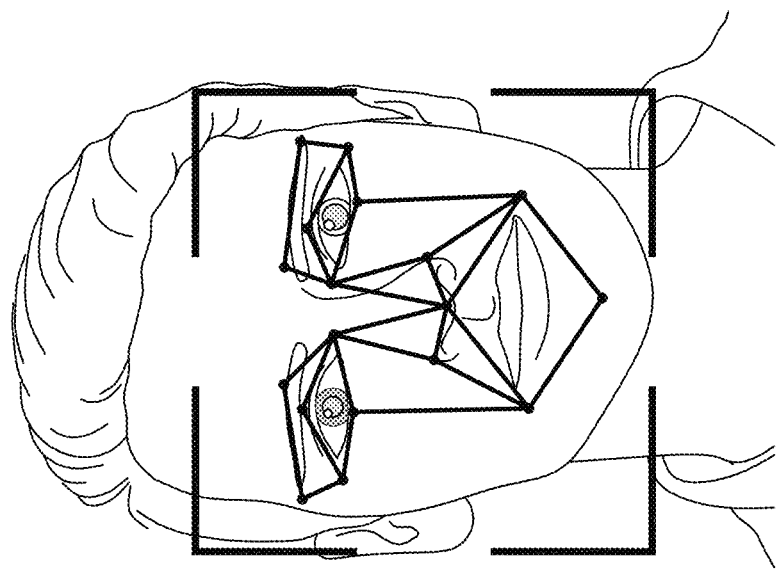
FIG. 6 is a schematic diagram of posture values according to an embodiment of the disclosure.

FIG. 6 is a schematic diagram of posture values according to an embodiment of the disclosure. Please refer to FIG. 1 to FIG. 6 at the same time, as shown in FIG. 6, the processor 140 may obtain the posture value corresponding to the user through the image capturing device 120. Then, if at least one of the posture values is greater than its corresponding posture value threshold, the processor 140 may adjust the image to the relaxed state. On the contrary, if none of these posture values are greater than their corresponding posture value thresholds, the processor 140 may not adjust the image or adjust the image to the intense state.

It should be noted here that the processor 140 may simultaneously adjust the image displayed by the display device 130 according to the physiological information value and the posture value. For example, if the user is already in a state of ferocious expression (for example, the heavy gasping count exceeds 30 times per minute and the eye closing count exceeds 14 times per minute), the processor 140 may further refer to the current physiological information value of the user. If the physiological information value indicates that a systolic blood pressure in the blood pressure value is greater than 180 mm of mercury, a diastolic blood pressure in the blood pressure value is greater than 110 mm of mercury, or the heartbeat count is greater than "(220−user age)×0.6~0.8", then the processor 140 may adjust the image to the relaxed state.

In summary, the disclosed system and method for adjusting image based on physiological information and posture may determine whether the physiological information value and/or posture value are greater than the threshold value after obtaining the physiological information value and posture value of the user. If the physiological information value and/or posture value of the user during exercise is greater than the threshold value, the image may be automatically adjusted. Therefore, the user's safety in exercise may be improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

What is claimed is:

1. A method for adjusting an image based on physiological information and a posture, for a user, and adapted to a system comprising a wearable device, an image capturing device, a display device and a processor, wherein the display device is configured to display the image, the method for adjusting the image based on the physiological information and the posture comprising:
obtaining a physiological information value corresponding to the user by the processor through the wearable device;
obtaining a posture value corresponding to the user by the processor through the image capturing device; and
correspondingly adjusting the image by the processor based on at least one of the physiological information value and the posture value,
wherein the step of correspondingly adjusting the image by the processor according to at least one of the physiological information value and the posture value comprises:
when the processor determines that the posture value is greater than a posture value threshold, adjusting the image to a relaxed state by the processor,
wherein the posture value comprises a teeth clenching count, and the posture value threshold comprises a teeth clenching count threshold, and
when the processor determines that the teeth clenching count is greater than the teeth clenching count threshold, adjusting the image to the relaxed state by the processor.

2. The method for adjusting the image based on the physiological information and the posture as claimed in claim 1, wherein the step of correspondingly adjusting the image by the processor according to at least one of the physiological information value and the posture value comprises:
when the processor determines that the physiological information value is greater than a physiological information threshold, adjusting the image to a relaxed state by the processor.

3. The method for adjusting the image based on the physiological information and the posture as claimed in claim 2, wherein the relaxed state indicates reducing a display speed of the image.

4. The method for adjusting the image based on the physiological information and the posture as claimed in claim 2, wherein the relaxed state corresponds to relaxed image content, wherein the relaxed image content indicates reducing a contrast of the image, reducing a saturation of the image, presenting the image in a cool tone or reducing a brightness of the image.

5. The method for adjusting the image based on the physiological information and the posture as claimed in claim 2, further comprising:
when the processor determines that the physiological information value is not greater than the physiological information threshold, adjusting the image to an intense state by the processor.

6. The method for adjusting the image based on the physiological information and the posture as claimed in claim 5, wherein the intense state indicates increasing a display speed of the image.

7. The method for adjusting the image based on the physiological information and the posture as claimed in claim 5, wherein the intense state corresponds to intense image content, wherein the intense image content indicates increasing a contrast of the image, increasing a saturation of the image, presenting the image in a warm tone, or maintaining a brightness of the image.

8. The method for adjusting the image based on the physiological information and the posture as claimed in claim 1, wherein the step of correspondingly adjusting the image by the processor according to at least one of the physiological information value and the posture value comprises:
when the processor determines that the posture value is not greater than a posture value threshold, adjusting the image to an intense state by the processor.

9. A system for adjusting an image based on physiological information and a posture, adapted to a user, comprising:
a wearable device, worn by the user, and configured to obtain a physiological information value corresponding to the user;
an image capturing device, configured to obtain a posture value corresponding to the user;
a display device, configured to display the image; and
a processor, communicatively connected to the wearable device, the image capturing device and the display device, and respectively obtaining the physiological information value and the posture value from the wearable device and the image capturing device;
wherein the processor correspondingly adjusts the image according to at least one of the physiological information value and the posture value,
wherein when the processor determines that the posture value is greater than a posture value threshold, the processor adjusts the image to a relaxed state,
wherein the posture value comprises a teeth clenching count, and the posture value threshold comprises a teeth clenching count threshold, and
when the processor determines that the teeth clenching count is greater than the teeth clenching count threshold, the processor adjusts the image to the relaxed state.

10. The system for adjusting the image based on the physiological information and the posture as claimed in claim 9, wherein
when the processor determines that the physiological information value is greater than a physiological information threshold, the processor adjusts the image to a relaxed state.

11. The system for adjusting the image based on the physiological information and the posture as claimed in claim 10, wherein the relaxed state indicates reducing a display speed of the image.

12. The system for adjusting the image based on the physiological information and the posture as claimed in claim 10, wherein the relaxed state corresponds to relaxed image content, wherein the relaxed image content indicates reducing a contrast of the image, reducing a saturation of the image, presenting the image in a cool tone or reducing a brightness of the image.

13. The system for adjusting the image based on the physiological information and the posture as claimed in claim 10, wherein
the display device is configured to receive the physiological information threshold or an adjustment operation of the physiological information threshold.

14. The system for adjusting the image based on the physiological information and the posture as claimed in claim 10, wherein the physiological information value comprises a heartbeat count, and the physiological information threshold comprises a heartbeat count threshold, wherein the user corresponds to a user age, and the heartbeat count threshold is associated with the user age, wherein
when the processor determines that the heartbeat count is greater than the heartbeat count threshold, the processor adjusts the image to the relaxed state.

15. The system for adjusting the image based on the physiological information and the posture as claimed in claim 10, wherein the physiological information value comprises a blood pressure value, and the physiological information threshold comprises a blood pressure value threshold, wherein
when the processor determines that the blood pressure value is greater than the blood pressure value threshold, the processor adjusts the image to the relaxed state.

16. The system for adjusting the image based on the physiological information and the posture as claimed in claim 10, wherein the physiological information value comprises a respiratory count, and the physiological information threshold comprises a respiratory count threshold, wherein
when the processor determines that the respiratory count is greater than the respiratory count threshold, the processor adjusts the image to the relaxed state.

17. The system for adjusting the image based on the physiological information and the posture as claimed in claim 10, wherein
when the processor determines that the physiological information value is not greater than the physiological information threshold, the processor does not adjust the image.

18. The system for adjusting the image based on the physiological information and the posture as claimed in claim 10, wherein
when the processor determines that the physiological information value is not greater than the physiological information threshold, the processor adjusts the image to an intense state.

19. The system for adjusting the image based on the physiological information and the posture as claimed in claim 18, wherein the intense state indicates increasing a display speed of the image.

20. The system for adjusting the image based on the physiological information and the posture as claimed in claim 18, wherein the intense state corresponds to intense image content, wherein the intense image content indicates increasing a contrast of the image, increasing a saturation of the image, presenting the image in a warm tone, or maintaining a brightness of the image.

21. The system for adjusting the image based on the physiological information and the posture as claimed in claim 9, wherein
the display device is configured to receive the posture value threshold or an adjustment operation of the posture value threshold.

22. The system for adjusting the image based on the physiological information and the posture as claimed in claim 9, wherein the posture value comprises an eye closing count, and the posture value threshold comprises an eye closing count threshold, wherein
when the processor determines that the eye closing count is greater than the eye closing count threshold, the processor adjusts the image to the relaxed state.

23. The system for adjusting the image based on the physiological information and the posture as claimed in claim 9, wherein the posture value comprises a painful expression count, and the posture value threshold comprises a painful expression count threshold, wherein
when the processor determines that the painful expression count is greater than the painful expression count threshold, the processor adjusts the image to the relaxed state.

24. The system for adjusting the image based on the physiological information and the posture as claimed in claim 9, wherein the posture value comprises a heavy gasping count, and the posture value threshold comprises a heavy gasping count threshold, wherein when the processor determines that the heavy gasping count is greater than the heavy gasping count threshold, the processor adjusts the image to the relaxed state.

25. The system for adjusting the image based on the physiological information and the posture as claimed in claim 9, wherein when the processor determines that the posture value is not greater than the posture value threshold, the processor does not adjust the image or adjusts the image to an intense state.

* * * * *